UNITED STATES PATENT OFFICE.

JAMES H. WORKMAN, OF COLORADO SPRINGS, COLORADO.

COATING COMPOSITION FOR PRESERVING AND PREVENTING RUST.

1,202,950.     Specification of Letters Patent.     Patented Oct. 31, 1916.

No Drawing.     Application filed February 18, 1916. Serial No. 79,173.

*To all whom it may concern:*

Be it known that I, JAMES H. WORKMAN, a citizen of the United States, residing at Colorado Springs, in the county of El Paso and State of Colorado, have invented new and useful Improvements in Coating Compositions for Preserving and Preventing Rust, of which the following is a specification.

The present invention has for its object the production of a composition of matter suitable for preventing rust, preserving wood and the like, and is also suitable for coating or painting generally.

The composition has been found to be particularly effective, for coating (either externally or internally) underground water pipes, gas pipes, vent stacks, walls, roofs, iron smoke stacks and the like.

In preparing my improved compound, I first dissolve shellac gum in oil of turpentine, in proportions capable of producing a substantially saturated solution, in order to make a thin fluid, or vehicle. I then prepare a mixture composed of 10 parts of "impure calcium sulfid," about 7 parts of powdered saw dust or powdered wood, and 2 parts of white lead. This mixture is then added to the liquid, in proportion to make a composition of about the consistency of ordinary mixed paint.

The composition can be applied with a brush or swab, either hot or cold, but when applied to wood or other absorbent surfaces, it is preferable to apply the same hot, in order to secure better penetration.

The material referred to as "impure calcium sulfid" is preferably prepared by mixing together 10 parts of powdered lime and 9 parts of sulfur and heating the mixture to a temperature slightly below the vaporizing point of sulfur, for about one hour in a closed crucible. The product after cooling, is rubbed up to an impalpable powder, and when made in this manner will contain not less than about 36% of actual calcium sulfid, together with variable amounts of calcium sulfate, sulfite and hyposulfite.

The turpentine which I preferably employ is ordinary crude turpentine, and when this material evaporates, it is noted that there remains a thin coating of a resinous material, which acts as a binder, and as a preservative.

The finished composition will preferably consist of about the following proportions, the parts being by weight:—

"Impure calcium sulfid" _ 10 parts
Wood powder _____ 7 parts
White lead _____ 2 parts
Shellac gum _____ 2 parts
Oil of turpentine _____ 9 parts

What I claim is:—

1. The herein described rust-proofing and preservative composition, comprising a vehicle containing gum shellac dissolved in oil of turpentine, carrying a solid material containing in powdered condition, "impure calcium sulfid", together with wood and white lead, all intimately mixed in proportions to form a mass of paint-like consistency.

2. A composition comprising an intimate mixture, by weight of—

"Impure calcium sulfid" _ 10 parts
Wood powder _____ 7 parts
White lead _____ 2 parts
Shellac gum _____ 2 parts
Oil of turpentine _____ 9 parts In testimony whereof I affix my signature in presence of two witnesses.

JAMES H. WORKMAN.

Witnesses:
ROBERT F. STENSON,
FRANK E. ZIEGLER.

Copies of this patent may be obtained for five cents each, by addressing the "Commissioner of Patents, Washington, D. C."